United States Patent
Kawahara et al.

(10) Patent No.: US 11,459,443 B2
(45) Date of Patent: Oct. 4, 2022

(54) RESIN MATERIAL, METHOD FOR PRODUCING RESIN MATERIAL, AND LAMINATE

(71) Applicant: SEKISUI CHEMICAL CO., LTD., Osaka (JP)

(72) Inventors: Yuko Kawahara, Tsukuba (JP); Keigo Oowashi, Osaka (JP); Kouji Ashiba, Osaka (JP); Rui Zhang, Osaka (JP); Kazuyuki Yahara, Osaka (JP); Osamu Inui, Osaka (JP); Hiroshi Maenaka, Tsukuba (JP)

(73) Assignee: SEKISUI CHEMICAL CO., LTD., Osaka (JP)

(*) Notice: Subject to any disclaimer, the term of this patent is extended or adjusted under 35 U.S.C. 154(b) by 233 days.

(21) Appl. No.: 16/623,261

(22) PCT Filed: Jun. 21, 2018

(86) PCT No.: PCT/JP2018/023691
§ 371 (c)(1),
(2) Date: Dec. 16, 2019

(87) PCT Pub. No.: WO2018/235920
PCT Pub. Date: Dec. 27, 2018

(65) Prior Publication Data
US 2020/0181358 A1    Jun. 11, 2020

(30) Foreign Application Priority Data

Jun. 23, 2017   (JP) ............................ JP2017-123511

(51) Int. Cl.
| | | |
|---|---|---|
| *C08K 3/22* | (2006.01) | |
| *B32B 7/027* | (2019.01) | |
| *C08K 3/38* | (2006.01) | |
| *H01B 5/14* | (2006.01) | |

(52) U.S. Cl.
CPC ............... *C08K 3/22* (2013.01); *B32B 7/027* (2019.01); *C08K 3/38* (2013.01); *H01B 5/14* (2013.01); *B32B 2307/302* (2013.01); *B32B 2307/304* (2013.01); *C08K 2003/2227* (2013.01); *C08K 2003/385* (2013.01); *C08K 2201/001* (2013.01)

(58) Field of Classification Search
None
See application file for complete search history.

(56) References Cited

U.S. PATENT DOCUMENTS

| | | | |
|---|---|---|---|
| 2010/0297453 A1 | 11/2010 | Maenaka et al. | |
| 2015/0318227 A1 | 11/2015 | Shimada et al. | |
| 2017/0081579 A1* | 3/2017 | Fujikawa | C08K 3/04 |
| 2020/0148815 A1* | 5/2020 | Ando | C08K 3/28 |

FOREIGN PATENT DOCUMENTS

| | | |
|---|---|---|
| CN | 105280587 A | 1/2016 |
| EP | 3 138 881 A1 | 3/2017 |
| EP | 3 428 963 A1 | 1/2019 |
| JP | 2009-164093 A | 7/2009 |
| JP | 2012-219251 A | 11/2012 |
| JP | 2013-32496 A | 2/2013 |
| JP | 2014-193965 A | 10/2014 |
| JP | 2015-189884 A | 11/2015 |
| JP | 2016-155985 A | 9/2016 |
| WO | WO-2014/115637 A1 | 7/2014 |
| WO | WO-2016/093248 A1 | 6/2016 |
| WO | WO-2016/098709 A1 | 6/2016 |

OTHER PUBLICATIONS

The First Office Action for the Application No. 201880026570.4 from The State Intellectual Property Office of the People's Republic of China dated Jun. 2, 2021.
Supplementary European Search Report for the Application No. EP 18 820 229.5 dated Feb. 24, 2021.
International Search Report for the Application No. PCT/JP2018/023691 dated Aug. 21, 2018.
Written Opinion of the International Searching Authority (PCT/ISA/237) for Application No. PCT/JP2018/023691 dated Aug. 21, 2018.
Written Opinion of the International Searching Authority (PCT/ISA/237) for Application No. PCT/JP2018/023691 dated Aug. 21, 2018 (English Translation mailed Jan. 2, 2020).

\* cited by examiner

*Primary Examiner* — Robert T Butcher
(74) *Attorney, Agent, or Firm* — Cheng Law Group, PLLC (57) ABSTRACT

Provided is a resin material capable of effectively enhancing insulation properties, adhesiveness and long-term insulation reliability. The resin material according to the present invention contains first inorganic particles having an average aspect ratio of 2 or less and an average circularity of 0.90 or less, second inorganic particles having an average aspect ratio of 2 or less and an average circularity of 0.95 or more, third inorganic particles having an average aspect ratio of more than 2, and a binder resin.

14 Claims, 1 Drawing Sheet

RESIN MATERIAL, METHOD FOR PRODUCING RESIN MATERIAL, AND LAMINATE

TECHNICAL FIELD

The present invention relates to a resin material containing inorganic particles and a binder resin, and a method for producing the resin material. The present invention also relates to a laminate including an insulating layer containing inorganic particles and a binder resin.

BACKGROUND ART

Electronic and electrical apparatuses have recently been downsized and allowed to have higher performance, and thus electronic components have been mounted with a higher package density. Thus, how to dissipate heat generated from the electronic component in a narrow space is a problem. Since the heat generated from the electronic component is directly linked to reliability of electronic and electrical apparatuses, efficient dissipation of the generated heat is an urgent issue.

As one means for solving the above problems, there is a means using a ceramic substrate having high thermal conduction as a heat dissipation substrate on which a power semiconductor device or the like is mounted. Examples of such a ceramic substrate include an alumina substrate and an aluminum nitride substrate.

However, the means using a ceramic substrate has problems that it is difficult to form a multilayer, processability is poor, and the cost is very high. In addition, since a difference in linear expansion coefficient between the ceramic substrate and a copper circuit is large, there is also a problem that the copper circuit tends to peel off during a cooling and heating cycle.

Thus, a resin composition using boron nitride having a low linear expansion coefficient, in particular, hexagonal boron nitride has attracted attention as a heat dissipation material. A crystal structure of hexagonal boron nitride is a layered structure of a hexagonal network similar to graphite, and a particle shape of hexagonal boron nitride is scaly. Thus, it is known that hexagonal boron nitride has a property that the thermal conductivity in the plane direction is higher than the thermal conductivity in the thickness direction, and the thermal conductivity is anisotropic. The resin composition described above may be used as a thermally conductive sheet or a prepreg.

An example of a thermally conductive sheet containing boron nitride is disclosed in Patent Document 1 below. Patent Document 1 discloses a thermally conductive sheet in which some or all of boron nitride particles are dispersed in a thermosetting resin in the form of agglomerated particles. The thermally conductive sheet further contains metal oxide particles. In the thermally conductive sheet, the total content of the metal oxide particles and the boron nitride particles is 40% by volume to 70% by volume. In the thermally conductive sheet, a volume ratio of the metal oxide particles and the boron nitride particles is 10:90 to 50:50. In the thermally conductive sheet, a median diameter of the metal oxide particles is 0.5 μm to 30 μm.

An example of a prepreg containing boron nitride is disclosed in Patent Document 2 below. Patent Document 2 discloses a prepreg for heat and pressure molding, in which a thermosetting resin composition containing an inorganic filler containing two or more components is in a sheet-like and semi-cured state. The inorganic filler includes a filler (1) which is an aggregate of primary particles having an average particle diameter d1 of 10 μm or more and 70 μm or less. The inorganic filler is in the form of particles and includes a filler (2) in which an average particle diameter d2 of the particles is 0.1 μm or more and 30 μm or less. In the thermosetting resin composition, the content of the filler (1) is 5% by volume to 40% by volume relative to 100% by volume of sum of thermosetting resin solids and the inorganic filler. In the thermosetting resin composition, the content of the filler (2) is 10% by volume to 50% by volume relative to 100% by volume of sum of thermosetting resin solids and the inorganic filler. The total content of the inorganic filler is 20% by volume to 80% by volume in 100% by volume of the thermosetting resin composition.

RELATED ART DOCUMENTS

Patent Documents

Patent Document 1: JP 2013-32496 A
Patent Document 2: JP 2012-219251 A

SUMMARY OF THE INVENTION

Problems to be Solved by the Invention

The conventional thermally conductive sheet containing boron nitride as described in Patent Documents 1 and 2 may be laminated on copper foil, a metal plate, or the like to be used as a laminate. In the laminate, a circuit pattern may be formed by treating the copper foil by etching or the like.

In the conventional thermally conductive sheet or the like containing boron nitride as described in Patent Documents 1 and 2, although the thermal conduction can be enhanced because boron nitride is used, it is difficult to enhance adhesiveness between the thermally conductive sheet or the like and the copper foil. In the conventional thermally conductive sheet or the like containing boron nitride, it is difficult to achieve both the thermal conduction and the adhesiveness.

Furthermore, in the conventional thermally conductive sheet or the like containing boron nitride, voids may be generated to reduce insulation properties. In addition, when the conventional thermally conductive sheet or the like containing boron nitride is used for the laminate, it is difficult to enhance the adhesiveness between the thermally conductive sheet or the like and the copper foil as described above, so that the formed circuit pattern may peel off from the laminate. When the circuit pattern peels off, partial discharge may occur between the peeled circuit pattern and an outer surface of the laminate to deteriorate the laminate. As a result, long-term insulation reliability may be reduced.

An object of the present invention is to provide a resin material capable of effectively enhancing the insulation properties, the adhesiveness, and the long-term insulation reliability and a method for producing the resin material. Another object of the present invention is to provide a laminate capable of effectively enhancing the insulation properties, the adhesiveness, and the long-term insulation reliability.

Means for Solving the Problems

According to a broad aspect of the present invention, there is provided a resin material containing first inorganic particles having an average aspect ratio of 2 or less and an average circularity of 0.90 or less, second inorganic particles having an average aspect ratio of 2 or less and an average circularity of 0.95 or more, third inorganic particles having an average aspect ratio of more than 2, and a binder resin.

In a specific aspect of the resin material according to the present invention, the content of the first inorganic particles is 5% by volume or more and 95% by volume or less relative to 100% by volume of sum of the first inorganic particles and the second inorganic particles.

In a specific aspect of the resin material according to the present invention, the content of the third inorganic particles is 30% by volume or more and 90% by volume or less relative to 100% by volume of sum of the first inorganic particles, the second inorganic particles, and the third inorganic particles.

In a specific aspect of the resin material according to the present invention, materials of the first and second inorganic particles include an aluminum element or a carbon element.

In a specific aspect of the resin material according to the present invention, the third inorganic particles are primary particles constituting agglomerated particles.

In a specific aspect of the resin material according to the present invention, the average aspect ratio of the third inorganic particles is 15 or less.

In a specific aspect of the resin material according to the present invention, a material of the third inorganic particles is boron nitride.

In a specific aspect of the resin material according to the present invention, when the resin material is heated at a temperature of 200° C. for 80 minutes and pressed at a pressure of 12 MPa to obtain a cured product of the resin material, an average particle diameter of the first inorganic particles and an average particle diameter of the second inorganic particles are 40% or less of the thickness of the cured product.

In a specific aspect of the resin material according to the present invention, the average particle diameter of the first inorganic particles and the average particle diameter of the second inorganic particles are 30 μm or less.

In a specific aspect of the resin material according to the present invention, thermal conductivity of the first inorganic particles, thermal conductivity of the second inorganic particles, or thermal conductivity of the third inorganic particles is 10 W/m·K or more.

In a specific aspect of the resin material according to the present invention, the binder resin contains a thermosetting compound and a thermosetting agent.

In a specific aspect of the resin material according to the present invention, the resin material is a resin sheet.

According to a broad aspect of the present invention, a method for producing the resin material described above is provided. The method includes a step of blending the first inorganic particles having an average aspect ratio of 2 or less and an average circularity of 0.90 or less, the second inorganic particles having an average aspect ratio of 2 or less and an average circularity of 0.95 or more, the third inorganic particles having an average aspect ratio of more than 2, and the binder resin.

According to a broad aspect of the present invention, there is provided a laminate including a thermal conductor, an insulating layer laminated on one surface of the thermal conductor, and a conductive layer laminated on a surface of the insulating layer opposite to the thermal conductor. In this laminate, the insulating layer contains first inorganic particles having an average aspect ratio of 2 or less and an average circularity of 0.90 or less, second inorganic particles having an average aspect ratio of 2 or less and an average circularity of 0.95 or more, third inorganic particles having an average aspect ratio of more than 2, and a binder resin.

Effect of the Invention

The resin material according to the present invention contains the first inorganic particles having an average aspect ratio of 2 or less and an average circularity of 0.90 or less, the second inorganic particles having an average aspect ratio of 2 or less and an average circularity of 0.95 or more, and the binder resin. The resin material according to the present invention further contains the third inorganic particles having an average aspect ratio of more than 2. Since the resin material according to the present invention is provided with the above-mentioned configuration, insulation properties, adhesiveness, and long-term insulation reliability can be effectively enhanced.

The laminate according to the present invention includes a thermal conductor, an insulating layer laminated on one surface of the thermal conductor, and a conductive layer laminated on a surface of the insulating layer opposite to the thermal conductor. In the laminate according to the present invention, the insulating layer contains the first inorganic particles having an average aspect ratio of 2 or less and an average circularity of 0.90 or less, the second inorganic particles having an average aspect ratio of 2 or less and an average circularity of 0.95 or more, and the binder resin. In the laminate according to the present invention, the insulating layer further contains the third inorganic particles having an average aspect ratio of more than 2. Since the laminate according to the present invention is provided with the above-mentioned configuration, insulation properties, adhesiveness, and long-term insulation reliability can be effectively enhanced.

MODE(S) FOR CARRYING OUT THE INVENTION

Figure 1:
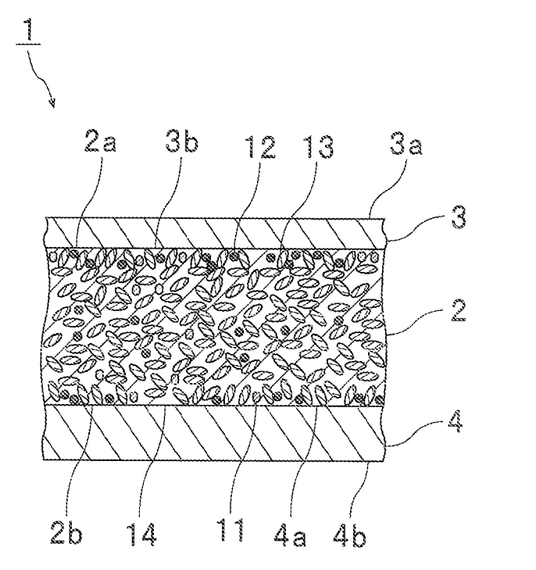
The FIGURE is a cross-sectional view schematically showing a laminate obtained using a resin material according to one embodiment of the present invention.

Hereinafter, the present invention will be described in detail.
(Resin Material and Laminate)

The resin material according to the present invention contains the first inorganic particles having an average aspect ratio of 2 or less and an average circularity of 0.90 or less, the second inorganic particles having an average aspect ratio of 2 or less and an average circularity of 0.95 or more, and the binder resin. The resin material according to the present invention further contains the third inorganic particles having an average aspect ratio of more than 2. The resin material according to the present invention contains a plurality of first inorganic particles. The resin material according to the present invention contains a plurality of second inorganic particles. The resin material according to the present invention contains a plurality of third inorganic particles.

The resin material according to the present invention is obtained by blending the first inorganic particles, the second inorganic particles, the third inorganic particles, and the binder resin.

The laminate according to the present invention includes a thermal conductor, an insulating layer laminated on one surface of the thermal conductor, and a conductive layer laminated on a surface of the insulating layer opposite to the thermal conductor. In the laminate according to the present invention, the insulating layer contains the first inorganic particles having an average aspect ratio of 2 or less and an average circularity of 0.90 or less, the second inorganic particles having an average aspect ratio of 2 or less and an average circularity of 0.95 or more, and the binder resin. In the laminate according to the present invention, the insulating layer further contains the third inorganic particles having an average aspect ratio of more than 2. In the laminate according to the present invention, the insulating layer contains a plurality of first inorganic particles. In the laminate according to the present invention, the insulating layer contains a plurality of second inorganic particles. In the laminate according to the present invention, the insulating layer contains a plurality of third inorganic particles.

Since the resin material and the laminate according to the present invention are provided with the above-mentioned configuration, insulation properties, adhesiveness, and long-term insulation reliability can be effectively enhanced.

The resin material according to the present invention may be used as a resin sheet. In a laminate in which a conductive layer such as copper foil is laminated on a first surface of the resin sheet (in the laminate, the resin sheet is an insulating layer), when the resin sheet and the conductive layer peeled off, the form of peeling was observed. With respect to the form of peeling, the present inventors have found that peeling may occur in a region near the first surface of the resin sheet due to breaking or peeling off of the third inorganic particles oriented in a plane direction in the region near the first surface of the resin sheet.

In the resin material and the laminate according to the present invention, the region near the first surface of the resin sheet contains not only the third inorganic particles having a relatively large aspect ratio but also the first and second inorganic particles having a relatively small aspect ratio. In the resin material and the laminate according to the present invention, in the process of stacking a thermal conductor or a conductive layer such as copper foil on a resin sheet and producing a laminate by pressing or the like, the orientation of the third inorganic particles is controlled in a thickness direction by the first and second inorganic particles. Thus, the content of the third inorganic particles oriented in the plane direction can be reduced, so that peeling in the region near the first surface of the resin sheet can be made less likely to occur. The second inorganic particles oriented in the thickness direction function as anchors, so that peeling in the region near the first surface of the resin sheet can be made less likely to occur.

As a result, in the resin material and the laminate according to the present invention, the adhesiveness between the resin sheet and the conductive layer such as copper can be more effectively enhanced.

Furthermore, in the resin material and the laminate according to the present invention, the orientation of the third inorganic particles is controlled in the thickness direction in the region near the first surface of the resin sheet, and in addition, since the content of the third inorganic particles in a region other than the region near the first surface of the resin sheet can be increased, the thermal conduction of the resin sheet and the laminate can be more effectively enhanced.

In the laminate according to the present invention, a circuit pattern may be formed by treating copper foil, which is a conductive layer, by etching or the like. When the formed circuit pattern peels off from the laminate, partial discharge may occur between the peeled circuit pattern and an outer surface of the laminate to deteriorate the laminate and reduce the long-term insulation reliability. In the resin material and the laminate according to the present invention, since the adhesiveness between the resin sheet and the conductive layer such as copper foil can be enhanced as described above, it is possible to prevent the formed circuit pattern from peeling off from the laminate and to more effectively enhance the long-term insulation reliability.

Furthermore, in the resin material and the laminate according to the present invention, since not only inorganic particles with different aspect ratios but also inorganic particles with different circularities are used, insulation properties, adhesiveness, and long-term insulation reliability can be enhanced in a well-balanced manner.

When only the first and third inorganic particles are used, the third inorganic particles easily follow the first inorganic particles having a small circularity, and the adhesiveness can be effectively enhanced. In addition, the thermal conduction can be effectively enhanced. However, a short circuit is likely to occur along the surface of the third inorganic particle, and the insulation properties are reduced.

When only the second and third inorganic particles are used, although the orientation of the third inorganic particles in a thickness direction is promoted because sphericity of the second inorganic particles is high, the orientation is unlikely to be completely perpendicular to the plane direction. Thus, although the insulation properties can be effectively enhanced, it is difficult to enhance the adhesiveness.

In the resin material and the laminate according to the present invention, the insulation properties and the adhesiveness can be enhanced in a well-balanced manner by using the first inorganic particle, the second inorganic particle, and the third inorganic particle. In the resin material and the laminate according to the present invention, since initial adhesiveness and insulation properties can be enhanced, the long-term insulation reliability can also be enhanced.

(First Inorganic Particles and Second Inorganic Particles)

The resin material and the laminate according to the present invention include the first inorganic particles and the second inorganic particles. The first and second inorganic particles preferably have insulation properties. The first and second inorganic particles are preferably insulating particles. The first inorganic particle is, for example, an inorganic filler. The second inorganic particle is, for example, an inorganic filler. At least one type of inorganic particle is used as the first inorganic particle. As the first inorganic particles, one type of inorganic particles may be used alone, and two or more types of inorganic particles may be used in combination. Two or more types of inorganic particles may be blended to constitute the first inorganic particle. The first inorganic particle may be constituted by mixing inorganic particles formed of a certain material with inorganic particles formed of a material different from the certain material. At least one type of inorganic particle is used as the second inorganic particle. As the second inorganic particles, one type of inorganic particles may be used alone, and two or more types of inorganic particles may be used in combination. Two or more types of inorganic particles may be blended to constitute the second inorganic particle. The second inorganic particle may be constituted by mixing inorganic particles formed of a certain material with inorganic particles formed of a material different from the certain material.

In the resin material and the laminate according to the present invention, the average aspect ratio of the first inorganic particles and the average aspect ratio of the second inorganic particles are 2 or less. Lower limits of the average aspect ratios of the first and second inorganic particles are not particularly limited. The average aspect ratio of the first inorganic particles and the average aspect ratio of the second inorganic particles may be 1 or more.

The aspect ratio of the first inorganic particles and the aspect ratio of the second inorganic particles each represent a major diameter/minor diameter. The aspect ratio of the first inorganic particles and the aspect ratio of the second inorganic particles are determined by observing randomly selected first or second inorganic particles with an electron microscope or an optical microscope, and measuring the major diameter/minor diameter of each inorganic particle. The average aspect ratio can be determined by averaging the aspect ratios of 50 random inorganic particles. The average aspect ratio of 50 random first inorganic particles is approximately equal to the average aspect ratio of all the first inorganic particles. The average aspect ratio of 50 random second inorganic particles is approximately equal to the average aspect ratio of all the second inorganic particles.

In the resin material and the laminate according to the present invention, the average circularity of the first inorganic particles is 0.90 or less. From the viewpoint of more effectively enhancing the thermal conduction, the insulation properties, the adhesiveness, and the long-term insulation reliability, the average circularity of the first inorganic particles is preferably more than 0.70 and more preferably 0.75 or more, and preferably 0.90 or less and more preferably 0.85 or less.

In the resin material and the laminate according to the present invention, the average circularity of the second inorganic particles is 0.95 or more. From the viewpoint of more effectively enhancing the thermal conduction, the insulation properties, the adhesiveness, and the long-term insulation reliability, the average circularity of the second inorganic particles is preferably 0.96 or more and more preferably 0.97 or more, and preferably 1.00 or less.

In the calculation of the circularity of the first inorganic particle and the circularity of the second inorganic particle, a cross-sectional area (S) and a perimeter length (L) of the first or second inorganic particle randomly selected from an electron microscope image of a cross section of a laminate produced by mixing the first or second inorganic particles with a thermosetting resin or the like are measured, and the circularity of the first or second inorganic particle can be calculated by the following formula (1). The circularity described above is a value representing a degree of circularity, and means that as the circularity approaches 1, the shape becomes closer to a circle.

$$\text{Circularity} = [4\Pi S/L^2] \quad (1)$$

The average circularity of the first inorganic particles is determined by averaging the circularities of all the first inorganic particles having an average aspect ratio of 2 or less and an average circularity of 0.90 or less. The average circularity of the second inorganic particles is determined by averaging the circularities of all the second inorganic particles having an average aspect ratio of 2 or less and an average circularity of 0.95 or more.

The average circularity of the first inorganic particles can be determined by averaging the circularities of randomly selected 50 first inorganic particles. The average circularity of 50 random first inorganic particles is approximately equal to the average circularity of all the first inorganic particles. The average circularity of the second inorganic particles can be determined by averaging the circularities of randomly selected 50 second inorganic particles. The average circularity of 50 random second inorganic particles is approximately equal to the average circularity of all the second inorganic particles.

The first inorganic particles are preferably rounded particles. Here, the rounded particles mean particles having a shape rounded overall and having few crystal corners and specifically mean particles having the above-mentioned circularity of 0.70 or more and 0.90 or less. When the first inorganic particles are rounded particles, the orientation of the third inorganic particles can be controlled, and the thermal conduction of the resin material and the laminate can be effectively enhanced.

The second inorganic particles are preferably spherical particles. Here, the spherical particle means a particle having the circularity of 0.95 or more. When the second inorganic particles are spherical particles, the flowability of the resin material can be effectively enhanced, the resin sheet or the like can be produced more favorably, and the insulation properties can be effectively enhanced.

In the resin material and the laminate according to the present invention, it is preferable to use the spherical particles and the rounded particles in combination.

In the resin material and the laminate according to the present invention, the particle diameter of the first inorganic particle is preferably 1 μm or more. In the resin material and the laminate according to the present invention, the particle diameter of the second inorganic particle is preferably 1 μm or more.

The particle diameters of the first and second inorganic particles each mean a diameter when the inorganic particles have a spherical shape, and when the inorganic particles have a shape other than a spherical shape, the particle diameters of the first and second inorganic particles each mean a diameter of an assumed sphere equivalent in volume to the inorganic particle.

When the resin material according to the present invention is heated at a temperature of 200° C. for 80 minutes and pressed at a pressure of 12 MPa to obtain a cured product of the resin material, an average particle diameter of the first inorganic particles and an average particle diameter of the second inorganic particles are preferably 40% or less of the thickness of the cured product and more preferably 25% or less of the thickness of the cured product. The average particle diameter of the first inorganic particles and the average particle diameter of the second inorganic particles are preferably 2% or more of the thickness of the cured product and more preferably 4% or more of the thickness of the cured product. When the average particle diameter of the first inorganic particles and the average particle diameter of the second inorganic particles satisfy the above preferable range, the thermal conduction, the insulation properties, the adhesiveness, and the long-term insulation reliability can be more effectively enhanced.

When a laminate or the like is produced using the resin material according to the present invention, curing conditions of the resin material according to the present invention are not particularly limited. When a laminate or the like is produced using the resin material according to the present invention, the resin material according to the present invention may be heated and pressed under conditions other than the heating conditions at 200° C. for 80 minutes and the pressure conditions of 12 MPa to cure the resin material. When the resin material according to the present invention is cured to obtain a cured product, the resin material according to the present invention may be heated and pressed under conditions other than the heating conditions at 200° C. for 80 minutes and the pressure conditions of 12 MPa to cure the resin material.

From the viewpoint of more effectively enhancing the thermal conduction, the insulation properties, the adhesiveness, and the long-term insulation reliability, the average particle diameter of the first inorganic particles is preferably 1 μm or more and more preferably 2 μm or more, and preferably 30 μm or less, more preferably less than 20 μm, and still more preferably 18 μm or less.

The average particle diameter of the first inorganic particles is determined by averaging the particle diameters of all the first inorganic particles having an average aspect ratio of 2 or less and an average circularity of 0.90 or less.

From the viewpoint of more effectively enhancing the thermal conduction, the insulation properties, the adhesiveness, and the long-term insulation reliability, the average particle diameter of the second inorganic particles is preferably 1 μm or more and more preferably 2 μm or more, and preferably 30 μm or less, more preferably less than 20 μm, and still more preferably 18 μm or less.

The average particle diameter of the second inorganic particles is determined by averaging the particle diameters of all the second inorganic particles having an average aspect ratio of 2 or less and an average circularity of 0.95 or more.

The average particle diameter of the first inorganic particles and the average particle diameter of the second inorganic particles are each preferably an average particle diameter obtained by averaging particle diameters on a volume basis. The average particle diameter of the first inorganic particles and the average particle diameter of the second inorganic particles are each preferably a particle diameter (d50) of the first or second inorganic particle that is obtained when a cumulative volume of the first or second inorganic particles is 50%. The average particle diameter of the first inorganic particles and the average particle diameter of the second inorganic particles can be measured using a "laser diffraction particle size distribution measuring apparatus" manufactured by HORIBA, Ltd. The average particle diameter of the first inorganic particles and the average particle diameter of the second inorganic particles can be determined by observing randomly selected 50 first and second inorganic particles with an electron microscope or an optical microscope, measuring the particle diameter of each inorganic particle, and calculating an average value. The average particle diameter of 50 random first inorganic particles is approximately equal to the average particle diameter of all the first inorganic particles. The average particle diameter of 50 random second inorganic particles is approximately equal to the average particle diameter of all the second inorganic particles.

Materials of the first and second inorganic particles are not particularly limited. The first and second inorganic particles are preferably insulating fillers. The material of the first inorganic particle does not necessarily need to be boron nitride. The material of the first inorganic particle does not necessarily need to be boron nitride. Examples of the materials of the first and second inorganic particles include metal oxides such as aluminum oxide (alumina), calcium oxide and magnesium oxide, metal nitrides such as aluminum nitride and titanium nitride, metal hydroxides such as aluminum hydroxide and magnesium hydroxide, metal carbonates such as calcium carbonate and magnesium carbonate, metal silicates such as calcium silicate, hydrated metal compounds, crystalline silica, amorphous silica, boron nitride, silicon carbide, and diamonds. One kind of the materials of the first and second inorganic particles may be used alone, and two or more kinds thereof may be used in combination.

From the viewpoint of practical use and from the viewpoint of more effectively enhancing the thermal conduction, the adhesiveness, and the long-term insulation reliability, the materials of the first and second inorganic particles preferably include an aluminum element or a carbon element.

From the viewpoint of practical use and from the viewpoint of more effectively enhancing the thermal conduction, the adhesiveness, and the long-term insulation reliability, the material of the first inorganic particle is preferably aluminum oxide (alumina), aluminum nitride, aluminum hydroxide or diamond. From the viewpoint of practical use and from the viewpoint of more effectively enhancing the thermal conduction, the adhesiveness, and the long-term insulation reliability, the material of the first inorganic particle is more preferably aluminum oxide (alumina) or diamond. One kind of these preferred materials may be used alone, and two or more kinds thereof may be used in combination.

From the viewpoint of practical use and from the viewpoint of more effectively enhancing the thermal conduction, the insulation properties, the adhesiveness, and the long-term insulation reliability, the material of the second inorganic particle is preferably aluminum oxide (alumina), aluminum nitride, aluminum hydroxide or diamond. From the viewpoint of practical use and from the viewpoint of more effectively enhancing the thermal conduction, the insulation properties, the adhesiveness, and the long-term insulation reliability, the material of the second inorganic particle is more preferably aluminum oxide (alumina) or diamond. One kind of these preferred materials may be used alone, and two or more kinds thereof may be used in combination.

From the viewpoint of more effectively enhancing the thermal conduction, the thermal conductivity of the first inorganic particle is preferably 10 W/m·K or more and more preferably 20 W/m·K or more. An upper limit of the thermal conductivity of the first inorganic particle is not particularly limited. The thermal conductivity of the first inorganic particle may be 300 W/m·K or less or 200 W/m·K or less. When the thermal conductivity of the first inorganic particle is in the above-mentioned preferable range, the adhesiveness and the insulation properties can be enhanced, and in addition, the thermal conduction can be enhanced.

From the viewpoint of more effectively enhancing the thermal conduction, the thermal conductivity of the second inorganic particle is preferably 10 W/m·K or more and more preferably 20 W/m·K or more. An upper limit of the thermal conductivity of the second inorganic particle is not particularly limited. The thermal conductivity of the second inorganic particle may be 300 W/m·K or less or 200 W/m·K or less. When the thermal conductivity of the second inorganic particle is in the above-mentioned preferable range, the adhesiveness and the insulation properties can be enhanced, and in addition, the thermal conduction can be enhanced.

The content of the first inorganic particles in 100% by volume of the resin material and 100% by volume of the insulating layer is preferably 0.5% by volume or more and more preferably 3% by volume or more, and preferably 55% by volume or less and more preferably 40% by volume or less. When the content of the first inorganic particles is in the range from the above lower limit to the above upper limit inclusive, the thermal conduction, the insulation properties, the adhesiveness, and the long-term insulation reliability can be more effectively enhanced.

The content of the second inorganic particles in 100% by volume of the resin material and 100% by volume of the insulating layer is preferably 0.5% by volume or more and more preferably 3% by volume or more, and preferably 55% by volume or less and more preferably 40% by volume or less. When the content of the second inorganic particles is in the range from the above lower limit to the above upper limit inclusive, the thermal conduction, the insulation properties, the adhesiveness, and the long-term insulation reliability can be more effectively enhanced.

In the resin material and the insulating layer, the content of the first inorganic particles relative to 100% by volume of sum of the first inorganic particles and the second inorganic particles is preferably 5% by volume or more and more preferably 20% by volume or more, and 95% by volume or less and more preferably 80% by volume or less. When the content of the first inorganic particles is in the range from the above lower limit to the above upper limit inclusive, the thermal conduction, the insulation properties, the adhesiveness, and the long-term insulation reliability can be more effectively enhanced.

From the viewpoint of more effectively enhancing the thermal conduction, the insulation properties, the adhesiveness, and the long-term insulation reliability, the content of the second inorganic particles relative to 100% by volume of sum of the first inorganic particles and the second inorganic particles is preferably 5% by volume or more and more preferably 20% by volume or more, 95% by volume or less and more preferably 80% by volume or less.

The content of the first inorganic particles relative to 100% by volume of sum of the first inorganic particles, the second inorganic particles, and the third inorganic particles is preferably 3% by volume or more and more preferably 5% by volume or more, and 50% by volume or less and more preferably 30% by volume or less. When the content of the first inorganic particles is in the range from the above lower limit to the above upper limit inclusive, the thermal conduction, the insulation properties, the adhesiveness, and the long-term insulation reliability can be more effectively enhanced.

The content of the second inorganic particles relative to 100% by volume of sum of the first inorganic particles, the second inorganic particles, and the third inorganic particles is preferably 3% by volume or more and more preferably 5% by volume or more, and 50% by volume or less and more preferably 30% by volume or less. When the content of the second inorganic particles is in the range from the above lower limit to the above upper limit inclusive, the thermal conduction, the insulation properties, the adhesiveness, and the long-term insulation reliability can be more effectively enhanced.

(Third Inorganic Particle)

The resin material and the laminate according to the present invention include the third inorganic particles. The third inorganic particles preferably have insulation properties. The third inorganic particles are preferably insulating particles. The third inorganic particle is, for example, an inorganic filler. The third inorganic particle is preferably an insulating filler. At least one type of inorganic particle is used as the third inorganic particle. As the third inorganic particles, one type of inorganic particles may be used alone, and two or more types of inorganic particles may be used in combination. Two or more types of inorganic particles may be blended to constitute the third inorganic particle. The third inorganic particle may be constituted by mixing inorganic particles formed of a certain material with inorganic particles formed of a material different from the certain material.

In the resin material and the laminate according to the present invention, the average aspect ratio of the third inorganic particles is more than 2. From the viewpoint of more effectively enhancing the thermal conduction, the insulation properties, the adhesiveness, and the long-term insulation reliability, the average aspect ratio of the third inorganic particles is preferably 4 or more and more preferably 5 or more, and preferably 15 or less and more preferably 12 or less. The third inorganic particle is, for example, a plate-like filler. In the present specification, the plate-like filler is also included in the particles. One kind of the third inorganic particles may be used alone, and two or more kinds thereof may be used in combination.

The aspect ratio of the third inorganic particle represents a major diameter/minor diameter. The aspect ratio of the third inorganic particle is determined by observing a cross section of a sheet or a laminate, produced by mixing and curing the third inorganic particles and a curable resin, with an electron microscope or an optical microscope and measuring the major diameter/minor diameter of the third inorganic particles. The average aspect ratio can be determined by averaging the aspect ratios of 50 random third inorganic particles. The average aspect ratio of 50 random third inorganic particles is approximately equal to the average aspect ratio of all the third inorganic particles.

In the resin material and the laminate according to the present invention, the particle diameter of the third inorganic particle is preferably 1 μm or more.

The particle diameter of the third inorganic particle is preferably a major diameter.

From the viewpoint of more effectively enhancing the thermal conduction, the insulation properties, the adhesiveness, and the long-term insulation reliability, an average major diameter of the third inorganic particles is preferably 3 μm or more and more preferably 5 μm or more, and preferably 40 μm or less and more preferably 20 μm or less.

The average major diameter of the third inorganic particles is determined by averaging the major diameters of all the third inorganic particles having an average aspect ratio of more than 2.

The average major diameter of the third inorganic particles can be determined by observing randomly selected 50 third inorganic particles with an electron microscope or an optical microscope, measuring the major diameter of each inorganic particle, and calculating an average value. The average major diameter of 50 random third inorganic particles is approximately equal to the average major diameter of all the third inorganic particles. The average major diameter of the third inorganic particles can be also determined by observing a cross section of a sheet or a laminate, produced by mixing and curing the third inorganic particles and a curable resin, with an electron microscope or an optical microscope, measuring the major diameter of randomly selected 50 third inorganic particles, and calculating an average value.

From the viewpoint of more effectively enhancing the thermal conduction, the insulation properties, the adhesiveness, and the long-term insulation reliability, the third inorganic particles are preferably primary particles constituting agglomerated particles. It is preferable that the third inorganic particles be contained as some of the agglomerated particles. The resin material and the laminate according to the present invention may include agglomerated particles, and may include primary particles constituting agglomerated particles as the third inorganic particles. The third inorganic particle is preferably a primary particle constituting agglomerated particles. The third inorganic particles are preferably not agglomerated particles. Examples of the agglomerated particles include boron nitride agglomerated particles. Here, when the third inorganic particle is a primary particle constituting agglomerated particles, the average major diameter means the average major diameter of the primary particles.

From the viewpoint of more effectively enhancing the thermal conduction, the insulation properties, the adhesiveness, and the long-term insulation reliability, a material of the third inorganic particle is preferably boron nitride. The boron nitride is not particularly limited. Examples the boron nitride include hexagonal boron nitride, cubic boron nitride, boron nitride prepared by a reduction-nitridation method using a boron compound and ammonia, boron nitride prepared from a boron compound and a nitrogen-containing compound such as melamine, and boron nitride prepared from sodium borohydride and ammonium chloride. From the viewpoint of more effectively enhancing the thermal conduction, the boron nitride is preferably hexagonal boron nitride.

From the viewpoint of more effectively enhancing the thermal conduction, the thermal conductivity of the third inorganic particle is preferably 10 W/m·K or more and more preferably 30 W/m·K or more. Since the third inorganic particle has a relatively large aspect ratio and may have anisotropy in thermal conductivity, the thermal conductivity of the third inorganic particle is preferably an average thermal conductivity. An upper limit of the thermal conductivity of the third inorganic particle is not particularly limited. The thermal conductivity of the third inorganic particle may be 300 W/m·K or less or 200 W/m·K or less. When the thermal conductivity of the third inorganic particle is in the above-mentioned preferable range, the adhesiveness and the insulation properties can be enhanced, and in addition, the thermal conduction can be enhanced.

From the viewpoint of more effectively enhancing the thermal conduction, the thermal conductivity of the first inorganic particle, the thermal conductivity of the second inorganic particle, or the thermal conductivity of the third inorganic particle is preferably 10 W/m·K or more. From the viewpoint of more effectively enhancing the thermal conduction, the thermal conductivity of at least one of the first inorganic particle, the second inorganic particle, and the third inorganic particle is preferably 10 W/m·K or more. From the viewpoint of more effectively enhancing the thermal conduction, the thermal conductivity of the first inorganic particle, the thermal conductivity of the second inorganic particle, and the thermal conductivity of the third inorganic particle are more preferably 10 W/m·K or more.

The content of the third inorganic particles in 100% by volume of the resin material and 100% by volume of the insulating layer is preferably 25% by volume or more and more preferably 30% by volume or more, and preferably 65% by volume or less and more preferably 60% by volume or less. When the content of the third inorganic particles is in the range from the above lower limit to the above upper limit inclusive, the thermal conduction, the insulation properties, the adhesiveness, and the long-term insulation reliability can be more effectively enhanced.

The content of the third inorganic particles relative to 100% by volume of sum of the first inorganic particles, the second inorganic particles, and the third inorganic particles is preferably 30% by volume or more, more preferably 40% by volume or more, still more preferably 45% by volume or more, and particularly preferably 50% by volume or more, and preferably 90% by volume or less and more preferably 80% by volume or less. When the content of the third inorganic particles is in the range from the above lower limit to the above upper limit inclusive, the thermal conduction, the insulation properties, the adhesiveness, and the long-term insulation reliability can be more effectively enhanced.

(Inorganic Particles Having Particle Diameter of Less than 1 μm)

The resin material and the laminate according to the present invention may contain inorganic particles (fourth inorganic particles) having a particle diameter of less than 1 μm. The resin material and the laminate according to the present invention may contain the fourth inorganic particles as the first inorganic particles, the fourth inorganic particles as the second inorganic particles, or the fourth inorganic particles as the third inorganic particles. The resin material and the laminate according to the present invention may contain the fourth inorganic particles as the first inorganic particles, the second inorganic particles, and the third inorganic particles. From the viewpoint of more effectively enhancing the thermal conduction, the insulation properties, the adhesiveness, and the long-term insulation reliability, the resin material and the laminate preferably contain the fourth inorganic particles. The fourth inorganic particles may be agglomerated particles or primary particles constituting the agglomerated particles. A material of the fourth inorganic particle is not particularly limited. Examples of the material of the fourth inorganic particle include the above-mentioned material of the first inorganic particle, the above-mentioned material of the second inorganic particle, and the third inorganic particle.

From the viewpoint of more effectively enhancing the thermal conduction, the particle diameter of the fourth inorganic particle is preferably less than 1 μm. The particle diameter of the fourth inorganic particle can be determined by the above-mentioned method of calculating the particle diameter of the first inorganic particle, the particle diameter of the second inorganic particle, or the particle diameter of the third inorganic particle.

In the resin material and the laminate according to the present invention, the content of the fourth inorganic particles is not particularly limited. From the viewpoint of more effectively enhancing the thermal conduction, the content of the fourth inorganic particles in 100% by volume of the resin material and 100% by volume of the insulating layer is preferably 0.5% by volume or more and more preferably 1% by volume or more, and preferably 5% by volume or less and more preferably 3% by volume or less.

The first inorganic particles, the second inorganic particles, the third inorganic particles, and the fourth inorganic particles may be surface-treated with a surface treatment agent such as a silane coupling agent.

(Binder Resin: Thermosetting Compound)

The resin material and the laminate according to the present invention include a binder resin. The binder resin is not particularly limited. As the binder resin, a known insulating resin is used. The binder resin preferably contains a thermoplastic component (thermoplastic compound) or a curable component and more preferably contains the curable component. Examples of the curable component include a thermosetting component and a photocurable component. The thermosetting component preferably contains a thermosetting compound and a thermosetting agent. The photocurable component preferably contains a photocurable compound and a photoinitiator. The binder resin preferably contains a thermosetting component. The binder resin preferably contains a thermosetting compound and a thermosetting agent. The thermosetting component may contain a curing accelerator. The binder resin may contain a curing accelerator. One kind of the binder resin may be used alone, and two or more kinds thereof may be used in combination.

The thermosetting compound is not particularly limited. Examples of the thermosetting compound include styrene compounds, phenoxy compounds, oxetane compounds, epoxy compounds, episulfide compounds, (meth)acrylic compounds, phenol compounds, amino compounds, unsaturated polyester compounds, polyurethane compounds, silicone compounds and polyimide compounds. One kind of the thermosetting compound may be used alone, and two or more kinds thereof may be used in combination.

From the viewpoint of more effectively enhancing the thermal conduction, the insulation properties, the adhesiveness, and the long-term insulation reliability, the thermosetting compound preferably contains an epoxy compound. The epoxy compound is an organic compound having at least one epoxy group. One kind of the epoxy compound may be used alone, and two or more kinds thereof may be used in combination.

Examples of the epoxy compound include a bisphenol A type epoxy compound, a bisphenol F type epoxy compound, a bisphenol S type epoxy compound, a phenol novolac type epoxy compound, a biphenyl type epoxy compound, a biphenyl novolac type epoxy compound, a biphenol type epoxy compound, a naphthalene type epoxy compound, a fluorene type epoxy compound, a phenol aralkyl type epoxy compound, a naphthol aralkyl type epoxy compound, a dicyclopentadiene type epoxy compound, an anthracene type epoxy compound, an epoxy compound having an adamantane skeleton, an epoxy compound having a tricyclodecane skeleton, a naphthylene ether type epoxy compound, and an epoxy compound having a triazine nucleus in its skeleton.

From the viewpoint of more effectively enhancing the thermal conduction, the insulation properties, the adhesiveness, and the long-term insulation reliability, the epoxy compound is preferably a bisphenol A type epoxy compound.

From the viewpoint of more effectively enhancing the thermal conduction, the insulation properties, the adhesiveness, and the long-term insulation reliability, the content of the thermosetting compound in 100% by volume of the resin material is preferably 20% by volume or more and more preferably 25% by volume or more, and preferably 80% by volume or less and more preferably 70% by volume or less. From the viewpoint of more effectively enhancing the thermal conduction, the insulation properties, the adhesiveness, and the long-term insulation reliability, a content of a component derived from the thermosetting compound in 100% by volume of the insulating layer is preferably 20% by volume or more and more preferably 25% by volume or more, and preferably 80% by volume or less and more preferably 70% by volume or less.

(Binder Resin: Thermosetting Agent)

For the resin material and the laminate according to the present invention, a thermosetting agent is preferably used together with the thermosetting compound. The thermosetting agent is not particularly limited. As the thermosetting agent, a thermosetting agent capable of curing the thermosetting compound can be used suitably. Also, as used herein, the thermosetting agent includes a curing catalyst. One kind of the thermosetting agents may be used alone, and two or more kinds thereof may be used in combination.

Examples of the thermosetting agent include cyanate ester compounds (cyanate ester curing agents), phenolic compounds (phenol thermosetting agents), amine compounds (amine thermosetting agents), thiol compounds (thiol thermosetting agents), imidazole compounds, phosphine compounds, acid anhydrides, active ester compounds, and dicyandiamide. The thermosetting agent preferably has a functional group capable of reacting with an epoxy group of the epoxy compound described above.

Examples of the cyanate ester compound include novolac type cyanate ester resins, bisphenol type cyanate ester resins, and prepolymers obtained by partially trimerizing those. Examples of the novolac type cyanate ester resins include phenol novolac type cyanate ester resins, and alkylphenol type cyanate ester resins. Examples of the bisphenol type cyanate ester resins include bisphenol A type cyanate ester resins, bisphenol E type cyanate ester resins, and tetramethyl bisphenol F type cyanate ester resins.

Examples of commercially available products of the cyanate ester compound include phenol novolac type cyanate ester resins ("PT-30" and "PT-60" manufactured by Lonza Japan Ltd.), and prepolymers ("BA-230S," "BA-3000S," "BTP-1000S," and "BTP-6020S" manufactured by Lonza Japan Ltd.) obtained by trimerizing bisphenol type cyanate ester resins.

Examples of the phenolic compound include novolac type phenols, biphenol type phenols, naphthalene type phenols, dicyclopentadiene type phenols, aralkyl type phenols, and dicyclopentadiene type phenols.

Examples of commercially available products of the phenolic compound include novolac type phenols ("TD-2091" manufactured by DIC Corporation), biphenyl novolac type phenols ("MEHC-7851" manufactured by Meiwa Plastic Industries, Ltd.), aralkyl type phenolic compounds ("MEH-7800" manufactured by Meiwa Plastic Industries, Ltd.), and phenols ("LA1356" and "LA3018-50P" manufactured by DIC Corporation) having an aminotriazine skeleton.

The total content of the thermosetting compound and the thermosetting agent in 100% by volume of the resin material is preferably 20% by volume or more and more preferably 25% by volume or more, and preferably 50% by volume or less and more preferably 45% by volume or less.

The total content of a component derived from the thermosetting compound and the thermosetting agent in 100% by volume of the insulating layer is preferably 20% by volume or more and more preferably 25% by volume or more, and preferably 50% by volume or less and more preferably 45% by volume or less. When the above-mentioned total content is in the range from the above lower limit to the above upper limit inclusive, the thermal conduction and the adhesiveness can be more effectively enhanced. A content ratio of the thermosetting compound and the thermosetting agent is appropriately selected so that the thermosetting compound cures.

The content of the thermosetting agent is appropriately selected so that the thermosetting compound cures well. The content of the thermosetting agent is preferably 1 part by weight or more and more preferably 3 parts by weight or more, and preferably 50 parts by weight or less and more preferably 30 parts by weight or less based on 100 parts by weight of the thermosetting compound. When the content of the thermosetting agent is more than or equal to the above lower limit, it is more easy to sufficiently cure the thermosetting compound. When the content of the thermosetting agent is less than or equal to the above upper limit, an excess thermosetting agent that does not contribute to curing is less likely to be generated. Thus, heat resistance and adhesiveness of a cured product are further enhanced.

(Other Ingredients)

Other than the above-described ingredients, the resin material may include other ingredients, which are generally used for a resin sheet and a curable sheet, such as a curing accelerator, a dispersant, a chelating agent, and an oxidation inhibitor. The resin material may contain a polymer component in order to enhance formability of a resin sheet and the like. Examples of the polymer component include polyimide. The resin material may contain a solvent. From the viewpoint of further suppressing generation of voids in a resin sheet or the like, the content of the solvent in 100% by weight of the resin material is preferably 5% by weight or less.

(Other Details of Resin Material)

The resin material may be a paste or a curable paste. The resin material may be a resin sheet or a curable sheet. When the resin material contains a curable component, a cured product can be obtained by curing the resin material. The cured product is a cured product of the resin material and is formed of the resin material.

From the viewpoint of more effectively enhancing the adhesiveness and the thermal conduction, the resin material may be produced by laminating two or more resin sheets. At least one of the two or more resin sheets may be the resin material according to the present invention.

A method for producing the resin material includes a step of blending the first inorganic particles, the second inorganic particles, the third inorganic particles, and the binder resin. In the above step, a method of blending the first inorganic particles, the second inorganic particles, the third inorganic particles, and the binder resin can be a conventionally known mixing method, and is not particularly limited. Examples of the method of blending the first inorganic particles, the second inorganic particles, the third inorganic particles, and the binder resin include a kneading method using a homodisper stirrer.

(Other Details of Laminate)

The laminate according to the present invention includes a thermal conductor, an insulating layer, and a conductive layer. The insulating layer is laminated on one surface of the thermal conductor. The conductive layer is laminated on a surface of the insulating layer opposite to the thermal conductor. The insulating layer may be laminated also on the other surface of the thermal conductor. In the laminate according to the present invention, a material of the insulating layer is the resin material described above. In the laminate according to the present invention, the insulating layer is preferably the above-mentioned cured product of the resin material. The cured product may be obtained by applying heat and pressure treatment to the resin material using a press or the like. The vacuum does not have to be provided during pressing.

Thermal Conductor:

The thermal conductivity of the thermal conductor is preferably 10 W/m·K or more. As the thermal conductor, an appropriate thermal conductor can be used. It is preferable to use a metal material for the thermal conductor. Examples of the metal material include metal foil and a metal plate. The thermal conductor is preferably the metal foil or the metal plate and more preferably the metal plate.

Examples of the material of the metal material include aluminum, copper, gold, silver, a graphite sheet. From the viewpoint of more effectively enhancing the thermal conduction, the material of the metal material is preferably aluminum, copper or gold, and more preferably aluminum or copper.

Conductive Layer:

The metal for forming the conductive layer is not particularly limited. Examples of the metal include gold, silver, palladium, copper, platinum, zinc, iron, tin, lead, aluminum, cobalt, indium, nickel, chromium, titanium, antimony, bismuth, thallium, germanium, cadmium, silicon, tungsten, molybdenum, and alloys of these. Further examples of the metal include tin-doped indium oxide (ITO) and solder. From the viewpoint of more effectively enhancing the thermal conduction, aluminum, copper or gold is preferable, and aluminum or copper is more preferable.

A method of forming the conductive layer is not particularly limited. Examples of the method of forming the conductive layer include a method by electroless plating, a method by electroplating, and a method of thermocompression-bonding the insulating layer and metal foil. The method of thermocompression-bonding the insulating layer and metal foil is preferable because the conductive layer can be formed in a simple manner.

The FIGURE is a cross-sectional view schematically showing a laminate obtained using a resin material according to one embodiment of the present invention. For convenience of illustration, the size and thickness shown in the FIGURE are different from the actual size and thickness.

A laminate 1 shown in the FIGURE includes an insulating layer 2, a conductive layer 3, and a thermal conductor 4. The insulating layer 2, the conductive layer 3, and the thermal conductor 4 are the above-described insulating layer, conductive layer, and thermal conductor.

The insulating layer 2 has one surface (first surface) 2a and the other surface (second surface) 2b. The conductive layer 3 has one surface (first surface) 3a and the other surface (second surface) 3b. The thermal conductor 4 has one surface (first surface) 4a and the other surface (second surface) 4b.

The conductive layer 3 is laminated on the side of one surface (first surface) 2a of the insulating layer 2. The thermal conductor 4 is laminated on the side of the other surface (second surface) 2b of the insulating layer 2. The insulating layer 2 is laminated on the side of the other surface (second surface) 3b of the conductive layer 3. The insulating layer 2 is laminated on the side of one surface (first surface) 4a of the thermal conductor 4. The insulating layer 2 is disposed between the conductive layer 3 and the thermal conductor 4.

The method of producing the laminate is not particularly limited. Examples of the method of producing the laminate include a method in which the thermal conductor, the insulating layer, and the conductive layer are stacked and thermocompression-bonded by vacuum pressing or the like.

In the laminate 1 according to the present embodiment, the insulating layer 2 contains first inorganic particles having an average aspect ratio of 2 or less and an average circularity of 0.90 or less. The insulating layer 2 contains second inorganic particles 12 having an average aspect ratio of 2 or less and an average circularity of 0.95 or more. The insulating layer 2 contains third inorganic particles 13 having an average aspect ratio of more than 2. The insulating layer 2 includes a cured product portion 14. The first inorganic particles 11, the second inorganic particles 12, and the third inorganic particles 13 are the first inorganic particles, the second inorganic particles, and the third inorganic particles described above.

In the laminate 1 according to the present embodiment, the binder resin contains a thermosetting compound and a thermosetting agent. The cured product portion 14 is a portion in which the binder resin is cured. The cured product portion 14 is obtained by curing the binder resin. The cured product portion 14 may be a portion in which a binder resin containing a thermosetting compound and a thermosetting agent is cured.

The laminate can be used in various applications where high thermal conduction, high mechanical strength, and the like are required. For example, the laminate is disposed between a heat generation component and a heat dissipation component to be used in electronic equipment. For example, the laminate is used as a radiator installed between a CPU and a fin or a radiator of a power card used in inverters of electric vehicles and the like. Further, the laminate may be used as an insulating circuit board by forming a circuit by etching or the like of the conductive layer of the laminate.

Hereinafter, the present invention will be clarified by way of specific examples and comparative examples of the present invention. The present invention is not limited to the following examples.

Binder Resin (Thermosetting Compound):

(1) "Epicoat 828US" manufactured by Mitsubishi Chemical Corporation, epoxy compound (2) "NC-3000" manufactured by Nippon Kayaku Co., Ltd., epoxy compound (3) "HP-4032D" manufactured by DIC Corporation, naphthalene type epoxy compound Binder Resin (Thermosetting Agent):

(1) "Dicyandiamide" manufactured by Tokyo Chemical Industry Co., Ltd.

(2) "2MZA-PW" manufactured by Shikoku Chemicals Corporation, isocyanurate-modified solid dispersed imidazole (3) Cyanate ester compound-containing liquid ("BA-3000S" manufactured by Lonza Japan, solid content: 75% by weight (the solid content is described in the blending amount shown in Table 2 below))

Binder Resin (Curing Accelerator):

(1) Imidazole compound (2-phenyl-4-methylimidazole, "2P4MZ" manufactured by Shikoku Chemicals Corporation, anionic curing accelerator)

Inorganic Particle:

(1) "AS-50" manufactured by Showa Denko K.K., average particle diameter: 9 μm, average aspect ratio: 1.2 (average aspect ratio is 2 or less), average circularity: 0.78 (average circularity is 0.90 or less), thermal conductivity: 30 W/m·K, aluminum oxide (2) "AS-40" manufactured by Showa Denko K.K., average particle diameter: 9 μm, average aspect ratio: 1.2 (average aspect ratio is 2 or less), average circularity: 0.77 (average circularity is 0.90 or less), thermal conductivity: 30 W/m·K, aluminum oxide (3) "AS-30" manufactured by Showa Denko K.K., average particle diameter: 9 μm, average aspect ratio: 1.2 (average aspect ratio is 2 or less), average circularity: 0.78 (average circularity is 0.90 or less), thermal conductivity: 30 W/m·K, aluminum oxide (4) "CB-P02" manufactured by Showa Denko K.K., average particle diameter: 2 μm, average aspect ratio: 1.0 (average aspect ratio is 2 or less), average circularity: 0.98 (average circularity is 0.95 or more), thermal conductivity: 30 W/m·K, aluminum oxide (5) "CB-P15" manufactured by Showa Denko K.K., average particle diameter: 16 μm, average aspect ratio: 1.0 (average aspect ratio is 2 or less), average circularity: 0.99 (average circularity is 0.95 or more), thermal conductivity: 30 W/m·K, aluminum oxide (6) "AX10-75" manufactured by Micron, Inc., average particle diameter: 8 μm, average aspect ratio: 1.0 (average aspect ratio is 2 or less), average circularity: 0.99 (average circularity is 0.95 or more), thermal conductivity: 30 W/m·K, aluminum oxide (7) "CB-A40" manufactured by Showa Denko K.K., average particle diameter: 40 μm, average aspect ratio: 1.0 (average aspect ratio is 2 or less), average circularity: 0.99, thermal conductivity: 30 W/m·K, aluminum oxide (8) "UHP-G1H" manufactured by Showa Denko K.K., average major diameter (primary particles): 4 μm, average aspect ratio: 7 (average aspect ratio is more than 2), thermal conductivity: 60 W/m·K, boron nitride agglomerated particles (9) "PTX60" manufactured by Momentive Performance Materials Inc., average major diameter (primary particles): 7 μm, average aspect ratio: 12 (average aspect ratio is more than 2), thermal conductivity: 60 W/m·K, boron nitride agglomerated particles (10) "PTX25" manufactured by Momentive Performance Materials Inc., average major diameter (primary particles): 7 μm, average aspect ratio: 12 (average aspect ratio is more than 2), thermal conductivity: 60 W/m·K, boron nitride agglomerated particles (11) "HP-40" manufactured by Mizushima Ferroalloy Co. Ltd., average major diameter (primary particles): 7 μm, average aspect ratio: 7 (average aspect ratio is more than 2), thermal conductivity: 60 W/m·K, boron nitride agglomerated particles (12) "PT100" manufactured by Momentive Performance Materials Inc., average major diameter (primary particles): 13 μm, average aspect ratio: 16 (average aspect ratio is more than 2), thermal conductivity: 60 W/m·K, boron nitride (Average Aspect Ratio of Inorganic Particles)

The average aspect ratio of the inorganic particles was measured as follows.

Method of Measuring Average Aspect Ratio of Inorganic Particles:

The average aspect ratio of the inorganic particle was determined by observing a cross section of a sheet or a laminate, produced by mixing and curing the inorganic particles and a curable resin, with an electron microscope or an optical microscope, measuring the major diameter/minor diameter of each of randomly selected 50 inorganic particles, and calculating an average value.

(Average Circularity of Inorganic Particles)

The circularity of the inorganic particles was measured as follows.

Method of Measuring Average Circularity of Inorganic Particles:

A cross-sectional area (S) and a perimeter length (L) of the inorganic particle randomly selected from an electron microscope image of a cross section of a laminate produced by mixing the inorganic particle with a thermosetting resin or the like were measured, and the circularity of the inorganic particle was calculated by the following formula (1). The circularities of 50 random inorganic particles were averaged to determine an average circularity.

$$\text{Circularity}=[4\Pi S/L^2] \tag{1}$$

(Average Particle Diameter of Inorganic Particles)

The average particle diameter of the inorganic particles was measured as follows.

Method of Measuring Average Particle Diameter of Inorganic Particles:

The average particle diameter of the inorganic particles was measured using a "laser diffraction particle size distribution measuring apparatus" manufactured by HORIBA, Ltd., and a value of the particle diameter (d50) of the inorganic particle was calculated when the cumulative volume of the inorganic particles was 50%.

(Average Major Diameter of Inorganic Particles)

The average major diameter of the inorganic particles was measured as follows.

Method of Measuring Average Major Diameter of Inorganic Particles:

A cross section of a sheet or a laminate produced by mixing and curing the inorganic particles and a curable resin was observed with an electron microscope or an optical microscope, the major diameters of randomly selected 50 inorganic particles were measured, and an average value was calculated.

Examples 1 to 10 and Comparative Examples 1 to 4

(1) Production of Resin Material

Components indicated in Tables 1 to 4 below were blended in the blending amounts indicated in Tables 1 to 4 below, and stirred with a planetary stirrer at 500 rpm for 25 minutes to obtain a resin material.

(2) Production of Laminate

The obtained resin material was coated on a release PET sheet (50 μm thick) to have a thickness of 350 μm and dried in an oven at 90° C. for 10 minutes to form a curable sheet (insulating layer). Thereafter, the release PET sheet was peeled off, both surfaces of the curable sheet (insulating layer) were sandwiched between copper foil and an aluminum plate and vacuum-pressed at a temperature of 200° C. and a pressure of 12 MPa to produce a laminate.

(Evaluation)

(1) Presence or Absence of First Inorganic Particle, Second Inorganic Particle, and Third Inorganic Particle In the obtained resin material, it was confirmed whether the first inorganic particles, the second inorganic particles, and the third inorganic particles were blended. The presence or absence of the first inorganic particles, the second inorganic particles, and the third inorganic particles was judged on the basis of the following criteria.

[Criteria for Judgment in Presence or Absence of First Inorganic Particle, Second Inorganic Particle, and Third Inorganic Particle]

○: The first inorganic particles, the second inorganic particles, and the third inorganic particles were blended in the resin material.

×: The first inorganic particle, the second inorganic particle, or the third inorganic particle was not blended in the resin material.

(2) Thermal Conductivity

The obtained laminate was cut into 1 cm squares, and then carbon black was sprayed on both sides to prepare a measurement sample. The thermal conductivity was calculated by a laser flash method using the obtained measurement sample. A relative value obtained when the value of Comparative Example 1 was expressed as 1.0 was calculated, and the thermal conductivity was judged on the basis of the following criteria.

[Criteria for Judgment in Thermal Conductivity]

○○: thermal conductivity was 1.3 or more.

○: thermal conductivity was more than 1.1 and less than 1.3.

Δ: Comparative Example 1 (1.0), or thermal conductivity was equivalent to Comparative Example 1 (1.0) (being equivalent means a range of 0.9 times to 1.1 times)

×: thermal conductivity was less than 0.9.

(3) 90 Degree Peel Strength

The obtained laminate was cut out to the size of 50 mm×120 mm to obtain a test sample. Copper foil was peeled off so that copper foil with a width of 10 mm was left in the center of the obtained test sample, and the peel strength of the copper foil was measured according to JIS C 6481 with respect to the copper foil with a width of mm in the center. As a peel strength tester for measuring the peel strength, a "Tensilon universal testing machine" manufactured by Orientec K.K. was used. For 20 test samples, the peel strength of the copper foil was measured. An average value of measurement values of the peel strength of the copper foil in the 20 test samples was taken as 90 degree peel strength. A relative value obtained when the value of Comparative Example 1 was expressed as 1.0 was calculated, and the 90 degree peel strength was judged on the basis of the following criteria.

[Criteria for judgment in 90 degree peel strength]

○: 90 degree peel strength was 1.3 or more.

○: 90 degree peel strength was more than 1.0 and less than 1.3.

Δ: Comparative Example 1 (1.0)

×: 90 degree peel strength was less than 1.0.

(4) Dielectric Breakdown Strength

By etching copper foil in the obtained laminate, the copper foil was patterned into a circle having a diameter of 2 cm to obtain a test sample. An alternating voltage was applied between the test samples at a temperature of 25° C. using a withstand voltage tester ("MODEL7473" manufactured by E-Tech Electronics Ltd.) so that the voltage was increased at a rate of 0.33 kV/sec. A voltage at which a current of 10 mA flowed through the test sample was taken as a dielectric breakdown voltage. The dielectric breakdown voltage was divided by the thickness of the test sample and thereby normalized to calculate the dielectric breakdown strength. The dielectric breakdown strength was judged on the basis of the following criteria.

[Criteria for Judgment in Dielectric Breakdown Strength]
 ⊙⊙: 60 kV/mm or more
 ⊙: 45 kV/mm or more and less than 60 kV/mm
 x: less than 45 kV/mm (5) Long-Term Insulation Reliability 20 test samples were obtained in the same manner as (4) above. Using the obtained 20 test samples, an AC voltage of 3 kV was applied between the test samples for 1000 hours under an environment of a temperature of 85° C. and a humidity of 85% to evaluate whether or not dielectric breakdown occurred. The long-term insulation reliability was judged on the basis of the following criteria.

[Criteria for Judgment in Long-Term Insulation Reliability]
 ⊙: 0 test samples where dielectric breakdown occurred
 Δ: 1 or more and less than 10 test samples where dielectric breakdown occurred
 x: 10 or more test samples where dielectric breakdown occurred The results are shown in the following Tables 1 to 4.

TABLE 1

| | | | Example 1 | Example 2 | Example 3 | Example 4 |
|---|---|---|---|---|---|---|
| Composition of resin material (wt %) | Binder resin (thermosetting compound) | Epicoat 828US | 19.7 | 19.7 | 19.7 | 18.5 |
| | | HP-4032D | | | | |
| | | NC-3000 | | | | |
| | Binder resin (thermosetting agent) | Dicyandiamide | 0.7 | 0.7 | 0.7 | 0.7 |
| | | 2MZA-PW | 0.4 | 0.4 | 0.4 | 0.4 |
| | | BA-3000S | | | | |
| | Binder resin (curing accelerator) | 2P4MZ | | | | |
| | Inorganic particle | AS-50 | 15.2 | | | 23.8 |
| | | AS-40 | | 18.2 | | |
| | | AS-30 | | | 12.1 | |
| | | CB-P02 | 15.2 | | | |
| | | CB-P15 | | 12.1 | | |
| | | CB-A40 | | | | |
| | | AX10-75 | | | 18.2 | 23.8 |
| | | UHP-G1H | 48.9 | | | |
| | | PTX60 | | | 48.9 | |
| | | PTX25 | | | | |
| | | HP-40 | | 48.9 | | 32.9 |
| | | PT100 | | | | |
| Content (vol %) of first inorganic particles in 100 vol % of resin material | | | 9 | 10.8 | 7.2 | 15 |
| Content (vol %) of second inorganic particles in 100 vol % of resin material | | | 9 | 7.2 | 10.8 | 15 |
| Content (vol %) of third inorganic particles in 100 vol % of resin material | | | 42 | 42 | 42 | 30 |
| Content (vol %) of first inorganic particles relative to 100 vol % of sum of first inorganic particles and second inorganic particles | | | 50 | 60 | 40 | 50 |
| Content (vol %) of second inorganic particles relative to 100 vol % of sum of first inorganic particles and second inorganic particles | | | 50 | 40 | 60 | 50 |
| Content (vol %) of first inorganic particles relative to 100 vol % of sum of first inorganic particles, second inorganic particles, and third inorganic particles | | | 15 | 18 | 12 | 25 |
| Content (vol %) of second inorganic particles relative to 100 vol % of sum of first inorganic particles, second inorganic particles, and third inorganic particles | | | 15 | 12 | 18 | 25 |
| Content (vol %) of third inorganic particles relative to 100 vol % of sum of first inorganic particles, second inorganic particles, and third inorganic particles | | | 70 | 70 | 70 | 50 |
| Evaluation | Presence or absence of first inorganic particle, second inorganic particle, and third inorganic particle | | ⊙ | ⊙ | ⊙ | ⊙ |
| | Thermal conductivity | | ⊙ | ⊙⊙ | ⊙ | ⊙ |
| | 90 degree peel strength | | ⊙ | ⊙⊙ | ⊙ | ⊙ |
| | Dielectric breakdown strength | | ⊙ | ⊙ | ⊙⊙ | ⊙⊙ |
| | Long-term insulation reliability | | ⊙ | ⊙ | ⊙ | ⊙ |

TABLE 2

|  |  |  | Example 5 | Example 6 | Example 7 |
|---|---|---|---|---|---|
| Composition of resin material (wt %) | Binder resin (thermosetting compound) | Epicoat 828US | 20.3 | 20.3 | 19.7 |
|  |  | HP-4032D |  |  |  |
|  |  | NC-3000 |  |  |  |
|  | Binder resin (thermosetting agent) | Dicyandiamide | 0.7 | 0.7 | 0.7 |
|  |  | 2MZA-PW | 0.4 | 0.4 | 0.4 |
|  |  | BA-3000S |  |  |  |
|  | Binder resin (curing accelerator) | 2P4MZ |  |  |  |
|  | Inorganic particle | AS-50 |  |  | 18.2 |
|  |  | AS-40 | 6.9 | 6.9 |  |
|  |  | AS-30 |  |  |  |
|  |  | CB-P02 |  |  |  |
|  |  | CB-P15 | 13.9 |  |  |
|  |  | CB-A40 |  |  | 12.1 |
|  |  | AX10-75 |  | 13.9 |  |
|  |  | DHP-G1H |  | 34.6 |  |
|  |  | PTX60 | 28.9 |  |  |
|  |  | PTX25 |  | 23.1 |  |
|  |  | HP-40 | 28.9 |  | 48.9 |
|  |  | PT100 |  |  |  |
| Content (vol %) of first inorganic particles in 100 vol % of resin material |  |  | 4 | 4 | 10.8 |
| Content (vol %) of second inorganic particles in 100 vol % of resin material |  |  | 8 | 8 | 7.2 |
| Content (vol %) of third inorganic particles in 100 vol % of resin material |  |  | 48 | 48 | 42 |
| Content (vol %) of first inorganic particles relative to 100 vol % of sum of first inorganic particles and second inorganic particles |  |  | 33.3 | 33.3 | 60 |
| Content (vol %) of second inorganic particles relative to 100 vol % of sum of first inorganic particles and second inorganic particles |  |  | 66.7 | 66.7 | 40 |
| Content (vol %) of first inorganic particles relative to 100 vol % of sum of first inorganic particles, second inorganic particles, and third inorganic particles |  |  | 6.7 | 6.7 | 18 |
| Content (vol %) of second inorganic particles relative to 100 vol % of sum of first inorganic particles, second inorganic particles, and third inorganic particles |  |  | 13.3 | 13.3 | 12 |
| Content (vol %) of third inorganic particles relative to 100 vol % of sum of first inorganic particles, second inorganic particles, and third inorganic particles |  |  | 80 | 80 | 70 |
| Evaluation | Presence or absence of first inorganic particle, second inorganic particle, and third inorganic particle |  | ∘ | ∘ | ∘ |
|  | Thermal conductivity |  | ∘∘ | ∘∘ | ∘∘ |
|  | 90 degree peel strength |  | ∘∘ | ∘∘ | ∘∘ |
|  | Dielectric breakdown strength |  | ∘∘ | ∘∘ | ∘ |
|  | Long-term insulation reliability |  | ∘ | ∘ | Δ |

TABLE 3

|  |  |  | Example 8 | Example 9 | Example 10 |
|---|---|---|---|---|---|
| Composition of resin material (wt %) | Binder resin (thermosetting compound) | Epicoat 828US | 19.7 |  |  |
|  |  | HP-4032D |  | 3.5 | 3.5 |
|  |  | NC-3000 |  | 6.9 | 6.9 |
|  | Binder resin (thermosetting agent) | Dicyandiamide | 0.7 |  |  |
|  |  | 2MZA-PW | 0.4 |  |  |
|  |  | BA-3000S |  | 10.4 | 10.4 |
|  | Binder resin (curing accelerator) | 2P4MZ |  | 0.021 | 0.021 |
|  | Inorganic particle | AS-50 |  | 15.2 | 18.2 |
|  |  | AS-40 | 18.2 |  |  |
|  |  | AS-30 |  |  |  |
|  |  | CB-P02 |  | 15.2 | 12.1 |
|  |  | CB-P15 | 12.1 |  |  |
|  |  | CB-A40 |  |  |  |
|  |  | AX10-75 |  |  |  |

TABLE 3-continued

|  |  | Example 8 | Example 9 | Example 10 |
|---|---|---|---|---|
|  | UHP-G1H |  | 24.5 | 48.9 |
|  | PTX60 |  |  |  |
|  | PTX25 | 34.3 |  |  |
|  | HP-40 |  | 24.5 |  |
|  | PT100 | 14.7 |  |  |
| Content (vol %) of first inorganic particles in 100 vol % of resin material | | 10.8 | 9 | 10.8 |
| Content (vol %) of second inorganic particles in 100 vol % of resin material | | 7.2 | 9 | 7.2 |
| Content (vol %) of third inorganic particles in 100 vol % of resin material | | 42 | 42 | 42 |
| Content (vol %) of first inorganic particles relative to 100 vol % of sum of first inorganic particles and second inorganic particles | | 60 | 50 | 60 |
| Content (vol %) of second inorganic particles relative to 100 vol % of sum of first inorganic particles and second inorganic particles | | 40 | 50 | 40 |
| Content (vol %) of first inorganic particles relative to 100 vol % of sum of first inorganic particles, second inorganic particles, and third inorganic particles | | 18 | 15 | 18 |
| Content (vol %) of second inorganic particles relative to 100 vol % of sum of first inorganic particles, second inorganic particles, and third inorganic particles | | 12 | 15 | 12 |
| Content (vol %) of third inorganic particles relative to 100 vol % of sum of first inorganic particles, second inorganic particles, and third inorganic particles | | 70 | 70 | 70 |
| Evaluation | Presence or absence of first inorganic particle, second inorganic particle, and third inorganic particle | ○ | ○ | ○ |
|  | Thermal conductivity | Δ | ○○ | ○ |
|  | 90 degree peel strength | ○ | ○○ | ○○ |
|  | Dielectric breakdown strength | ○ | ○○ | ○○ |
|  | Long-term insulation reliability | ○ | ○ | ○ |

TABLE 4

|  |  |  | Comparative Example 1 | Comparative Example 2 | Comparative Example 3 | Comparative Example 4 |
|---|---|---|---|---|---|---|
| Composition of resin material (wt %) | Binder resin (thermosetting compound) | Epicoat 828US | 19.7 | 18.5 | 16.2 | 21.7 |
|  |  | HP-4032D |  |  |  |  |
|  |  | NC-3000 |  |  |  |  |
|  | Binder resin (thermosetting agent) | Dicyandiamide | 0.7 | 0.7 | 0.6 | 0.8 |
|  |  | 2MZA-PW | 0.4 | 0.4 | 0.3 | 0.4 |
|  |  | BA-3000S |  |  |  |  |
|  | Binder resin (curing accelerator) | 2P4MZ |  |  |  |  |
|  | Inorganic particle | AS-50 |  |  |  |  |
|  |  | AS-40 |  |  | 41.5 |  |
|  |  | AS-30 |  | 47.5 |  |  |
|  |  | CB-P02 | 30.3 |  | 41.5 |  |
|  |  | CB-P15 |  |  |  |  |
|  |  | CB-A40 |  |  |  |  |
|  |  | AX10-75 |  |  |  |  |
|  |  | UHP-G1H |  | 32.9 |  | 23.1 |
|  |  | PTX60 |  |  |  |  |
|  |  | PTX25 | 48.9 |  |  | 54.0 |
|  |  | HP-40 |  |  |  |  |
|  |  | PT100 |  |  |  |  |
| Content (vol %) of first inorganic particles in 100 vol % of resin material | | | 0 | 30 | 30 | 0 |
| Content (vol %) of second inorganic particles in 100 vol % of resin material | | | 18 | 0 | 30 | 0 |
| Content (vol %) of third inorganic particles in 100 vol % of resin material | | | 42 | 30 | 0 | 60 |
| Content (vol %) of first inorganic particles relative to 100 vol % of sum of first inorganic particles and second inorganic particles | | | 0 | 100 | 50 | 0 |
| Content (vol %) of second inorganic particles relative to 100 vol % of sum of first inorganic particles and second inorganic particles | | | 100 | 0 | 50 | 0 |

TABLE 4-continued

|  |  | Comparative Example 1 | Comparative Example 2 | Comparative Example 3 | Comparative Example 4 |
|---|---|---|---|---|---|
| Content (vol %) of first inorganic particles relative to 100 vol % of sum of first inorganic particles, second inorganic particles, and third inorganic particles |  | 0 | 50 | 50 | 0 |
| Content (vol %) of second inorganic particles relative to 100 vol % of sum of first inorganic particles, second inorganic particles, and third inorganic particles |  | 30 | 0 | 50 | 0 |
| Content (vol %) of third inorganic particles relative to 100 vol % of sum of first inorganic particles, second inorganic particles, and third inorganic particles |  | 70 | 50 | 0 | 100 |
| Evaluation | Presence or absence of first inorganic particle, second inorganic particle, and third inorganic particle | x | x | x | x |
|  | Thermal conductivity | Δ | ○ | x | ○ |
|  | 90 degree peel strength | Δ | ○ | ○ | x |
|  | Dielectric breakdown strength | ○ | x | x | ○ |
|  | Long-term insulation reliability | Δ | x | x | Δ |

EXPLANATION OF SYMBOLS

1: Laminate
2: Insulating layer
2a: One surface (first surface)
2b: The other surface (second surface)
3: Conductive layer
3a: One surface (first surface)
3b: The other surface (second surface)
4: Thermal conductor
4a: One surface (first surface)
4b: The other surface (second surface)
11: First inorganic particle
12: Second inorganic particle
13: Third inorganic particle
14: Cured product portion (portion in which binder resin is cured)

The invention claimed is:

1. A resin material comprising:
 first inorganic particles having an average aspect ratio of 2 or less and an average circularity of 0.90 or less;
 second inorganic particles having an average aspect ratio of 2 or less and an average circularity of 0.95 or more;
 third inorganic particles having an average aspect ratio of more than 2; and
 a binder resin,
 the content of the first inorganic particles in 100% by volume of the resin material being 0.5% by volume or more and 55% by volume or less,
 the content of the second inorganic particles in 100% by volume of the resin material being 0.5% by volume or more and 55% by volume or less, and
 the content of the third inorganic particles in 100% by volume of the resin material being 25% by volume or more and 65% by volume or less.

2. The resin material according to claim 1, wherein the content of the first inorganic particles is 5% by volume or more and 95% by volume or less relative to 100% by volume of sum of the first inorganic particles and the second inorganic particles.

3. The resin material according to claim 1, wherein the content of the third inorganic particles is 30% by volume or more and 90% by volume or less relative to 100% by volume of sum of the first inorganic particles, the second inorganic particles, and the third inorganic particles.

4. The resin material according to claim 1, wherein materials of the first and second inorganic particles comprise an aluminum element or a carbon element.

5. The resin material according to claim 1, wherein the third inorganic particles are primary particles constituting agglomerated particles.

6. The resin material according to claim 1, wherein the average aspect ratio of the third inorganic particles is 15 or less.

7. The resin material according to claim 1, wherein a material of the third inorganic particles is boron nitride.

8. The resin material according to claim 1, wherein when the resin material is heated at a temperature of 200° C. for 80 minutes and pressed at a pressure of 12 MPa to obtain a cured product of the resin material,
 an average particle diameter of the first inorganic particles and an average particle diameter of the second inorganic particles are 40% or less of the thickness of the cured product.

9. The resin material according to claim 1, wherein the average particle diameter of the first inorganic particles and the average particle diameter of the second inorganic particles are 30 μm or less.

10. The resin material according to claim 1, wherein thermal conductivity of the first inorganic particles, thermal conductivity of the second inorganic particles, or thermal conductivity of the third inorganic particles is 10 W/m·K or more.

11. The resin material according to claim 1, wherein the binder resin contains a thermosetting compound and a thermosetting agent.

12. The resin material according to claim 1, wherein the resin material is a resin sheet.

13. A method for producing the resin material according to claim 1, the method comprising
 a step of blending the first inorganic particles having an average aspect ratio of 2 or less and an average circularity of 0.90 or less, the second inorganic particles having an average aspect ratio of 2 or less and an average circularity of 0.95 or more, the third inorganic particles having an average aspect ratio of more than 2, and the binder resin.

14. A laminate comprising:
a thermal conductor;
an insulating layer laminated on one surface of the thermal conductor; and
a conductive layer laminated on a surface of the insulating layer opposite to the thermal conductor,
the insulating layer containing first inorganic particles having an average aspect ratio of 2 or less and an average circularity of 0.90 or less, second inorganic particles having an average aspect ratio of 2 or less and an average circularity of 0.95 or more, third inorganic particles having an average aspect ratio of more than 2, and a binder resin,
the content of the first inorganic particles in 100% by volume of the insulating layer being 0.5% by volume or more and 55% by volume or less,
the content of the second inorganic particles in 100% by volume of the insulating layer being 0.5% by volume or more and 55% by volume or less, and
the content of the third inorganic particles in 100% by volume of the insulating layer being 25% by volume or more and 65% by volume or less.

\* \* \* \* \*